March 31, 1936.                E. W. DAVIS                2,035,639
                              GREASE GUN RACK
                            Filed Oct. 13, 1934
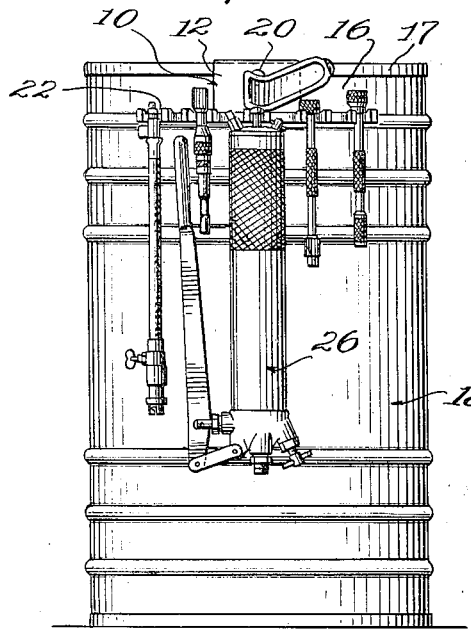
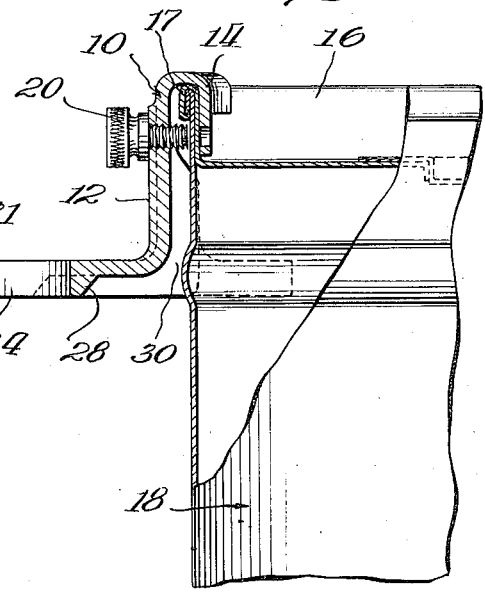
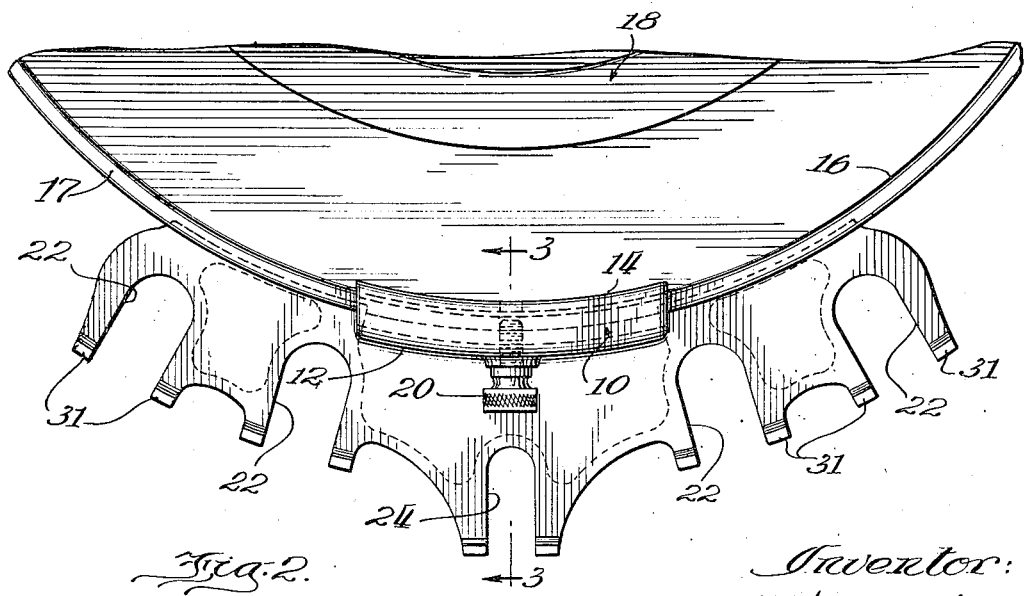
Inventor:
Ernest W. Davis Patented Mar. 31, 1936

2,035,639

UNITED STATES PATENT OFFICE 2,035,639

GREASE GUN RACK

Ernest W. Davis, Oak Park, Ill., assignor to Stewart-Warner Corporation, Chicago, Ill., a corporation of Virginia Application October 13, 1934, Serial No. 748,165

1 Claim. (Cl. 211—86)

My invention relates generally to lubricating apparatus, and more particularly to an improved rack for supporting lubricating equipment.

A number of different types of racks have been devised for general use in automobile service stations for supporting lubricating equipment such as grease guns and various adapters and parts thereof. These racks are, generally speaking, rather inconvenient to use due to the fact that they occupy a considerable amount of space in service stations in which the space for equipment is generally quite limited. Furthermore, such grease gun racks as are in use are usually quite expensive due to the fact that it is necessary to make the rack relatively large and of rigid construction in order that the lubricating equipment may be hung upon the rack in a readily accessible position. The racks are thus necessarily expensive and frequently so high priced that they cannot be afforded by the small service station.

In the rack of my invention an ordinary oil or grease drum is employed as the principal supporting member of the rack. The rack proper comprises merely a relatively light and inexpensive casting which may easily be attached to and removed from the lubricant drum.

It is thus an object of my invention to provide a simple and inexpensive rack for supporting grease guns and similar lubricating equipment being used in automobile service stations.

Other objects will appear from the following description, reference being had to the accompanying drawing in which:

Fig. 1 shows the rack attached to an oil drum and supporting a grease gun and its accessory parts;

Fig. 2 is a plan view of the rack shown attached to a lubricant drum; and

Fig. 3 is a vertical sectional view taken on the line 3—3 of Fig. 2.

The rack of my invention comprises a casting designated generally as 10, having a central upwardly extending bracket part 12 which has an inwardly and downwardly extending flange 14 formed integrally therewith. The bracket portion 12 may be attached to the upwardly extending wall 16 of an oil or grease drum 18 by means of a knurled head screw 20 which is threaded in the bracket portion 12 and is sufficiently long that, when screwed inwardly the maximum extent, its inner end will lie beneath the bead 17, and thus prevent accidental removal of the rack from the drum.

The casting 10 is generally arcuate in shape, having a plurality of U-shaped notches 22 formed therein to receive the various appurtenances of the grease gun. A relatively narrow U-shaped notch 24 is provided to receive the stem of a grease gun 26 as shown in Fig. 1. The casting 10 is suitably reenforced by webs 28, 30, and the ends of the prongs adjacent the U-shaped notches 22, 24 have upwardly projecting knobs 31 which prevent the grease gun and its appurtenances from sliding from the notches when inserted therein, as shown in Fig. 1.

In using the grease gun supporting rack of my invention the rack is attached to any conveniently positioned lubricant drum 18 by turning the set screw 20 to the position shown in Fig. 3. The grease gun and its appurtenances may then be hung from the rack by inserting these parts in the appropriate notches 22, 24. The grease gun and its parts will, because of the knobs 31, be held against accidentally slipping from the notches but will nevertheless be easily removable from the rack when it is desired to use them. Even though the lubricant drum is tilted slightly the gun and its appurtenant parts will not slide from their notches. Since the rack is loosely held on the drum it may easily be moved to any desired convenient position about the periphery of the upper end of the drum. The space between the flange 14 and the bracket portion 12 is of sufficient width that the rack may be attached to any of the various types and most of the different sizes of drums now in use.

By providing a rack of the type disclosed for each different type of lubricant, the gun used to dispense such lubricant may be hung upon its appropriate drum and the service station attendant will thus be able quickly and easily to select the grease gun containing the desired lubricant, since it is common practice conspicuously to label the lubricant drums to indicate the kind of lubricant contained therein. If desired, of course, a number of the grease gun racks may be attached to a single drum and thus grease guns containing the different types of lubricant may be carried by the lubricant drum which is most conveniently positioned relative to the automobile or other machine to be lubricated.

While I have shown and described but a single embodiment of my invention, it will be apparent to those skilled in the art that various slight changes and modifications may be made therein without departing from the invention as defined in the following claim.

I claim:

A rack for grease guns comprising a substantially crescent-shaped rigid member having its concavely arcuate edge conforming generally to the cylindrical wall of a lubricant drum upon which it is to be supported, said member having an integral bracket portion generally inverted U-shape in cross-section at its center adapted to embrace the upwardly projecting rim portion of the lubricant drum, said member having a horizontal shelf portion provided with a plurality of open end slots to receive a grease gun and its appurtenant parts, and a screw threaded in said bracket portion, said screw being constructed and arranged to project beneath the beaded edge of the rim of a drum and thereby prevent removal of the member from the drum but normally not engaging the rim, whereby said member may readily be shifted to different positions about the periphery of the top of the drum.

ERNEST W. DAVIS.